(12) United States Patent
Hase et al.

(10) Patent No.: US 10,079,439 B2
(45) Date of Patent: *Sep. 18, 2018

(54) METAL SURFACE COATING COMPOSITION AND TERMINAL-EQUIPPED COVERED ELECTRICAL WIRE USING SAME

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP); Kyushu University, Fukuoka-shi, Fukuoka (JP)

(72) Inventors: Tatsuya Hase, Mie (JP); Kazuo Nakashima, Mie (JP); Makoto Mizoguchi, Mie (JP)

(73) Assignees: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP); KYUSHU UNIVERSITY, Fukuoka-shi, Fukuoka (JP)

( * ) Notice: Subject to any disclaimer, the term of this patent is extended or adjusted under 35 U.S.C. 154(b) by 19 days.

This patent is subject to a terminal disclaimer.

(21) Appl. No.: 15/119,743

(22) PCT Filed: Jan. 29, 2015

(86) PCT No.: PCT/JP2015/052425
§ 371 (c)(1),
(2) Date: Aug. 18, 2016

(87) PCT Pub. No.: WO2015/125577
PCT Pub. Date: Aug. 27, 2015

(65) Prior Publication Data
US 2017/0062954 A1 Mar. 2, 2017

(30) Foreign Application Priority Data

Feb. 19, 2014 (JP) .................................. 2014-029245

(51) Int. Cl.
*H01R 4/58* (2006.01)
*H01R 4/18* (2006.01)
(Continued)

(52) U.S. Cl.
CPC ............. *H01R 4/185* (2013.01); *C08K 5/521* (2013.01); *C09D 5/08* (2013.01); *C09D 7/40* (2018.01);
(Continued)

(58) Field of Classification Search
CPC .......... H01B 7/28; H01B 7/2806; H01R 4/22; H01R 4/58; H01R 13/03; C08K 5/521; C09D 191/00; C10M 137/04
(Continued)

(56) References Cited

U.S. PATENT DOCUMENTS 6,478,885 B1   11/2002   Goodreau
6,528,661 B2    3/2003   Niddam
(Continued)

FOREIGN PATENT DOCUMENTS

CN   1671828 A    9/2005
CN   101517048 A  8/2009
(Continued)

OTHER PUBLICATIONS

International Search Report and Written Opinion for Application No. PCT/JP2015/052425 dated Apr. 28, 2015, 8 pages.
(Continued)

*Primary Examiner* — Matthew D Matzek
(74) *Attorney, Agent, or Firm* — Reising Ethington, P.C.

(57) ABSTRACT

A composition for a metal surface coating that does not require a posttreatment such as heating, has flexibility to be
(Continued)

able to follow deformation of a member to be coated, hardly peels off from a metal surface, and can be used for the purpose of corrosion protection, and a terminal-equipped covered electric wire using the same. The composition contains an adduct and a base oil. The adduct contains an acidic phosphate ester consisting of one or more kinds of compounds represented by General Formulae (1) and (2), and a metal, $P(=O)(-OR_1)(-OH)_2$ ... (1), $P(=O)(-OR_1)_2(-OH)$ ... (2), where $R_1$ represents a hydrocarbon group having 4 to 30 carbon atoms.

11 Claims, 2 Drawing Sheets

(51) Int. Cl.

| | | |
|---|---|---|
| C09D 7/63 | (2018.01) | |
| C09D 7/40 | (2018.01) | |
| C10M 137/06 | (2006.01) | |
| C09D 201/00 | (2006.01) | |
| C09D 5/08 | (2006.01) | |
| C09D 191/00 | (2006.01) | |
| H01R 4/70 | (2006.01) | |
| C08K 5/521 | (2006.01) | |
| H01R 13/03 | (2006.01) | |

(52) U.S. Cl.
CPC .............. *C09D 7/63* (2018.01); *C09D 191/00* (2013.01); *C09D 201/00* (2013.01); *C10M 137/06* (2013.01); *H01R 4/58* (2013.01); *H01R 4/70* (2013.01); *C10M 2223/042* (2013.01); *C10N 2230/12* (2013.01); *C10N 2240/50* (2013.01); *H01R 13/03* (2013.01)

(58) Field of Classification Search
USPC ............... 174/68.1, 98, 110 R, 110 SR, 176; 428/357
See application file for complete search history.

(56) References Cited

U.S. PATENT DOCUMENTS

| | | |
|---|---|---|
| 6,919,302 B2 | 7/2005 | Legros |
| 7,772,171 B2 | 8/2010 | Al-Ahmad |
| 2010/0093568 A1 | 4/2010 | Tagawa |
| 2016/0211053 A1* | 7/2016 | Hase ..................... C23F 11/10 |
| 2016/0264533 A1 | 9/2016 | Nomura et al. |

FOREIGN PATENT DOCUMENTS

| | | |
|---|---|---|
| CN | 105392924 A | 3/2016 |
| DE | 112014004782 T5 | 7/2016 |
| JP | S4748824 B1 | 12/1972 |
| JP | H04314795 A | 11/1992 |
| JP | H0633272 A | 2/1994 |
| JP | H0665589 A | 3/1994 |
| JP | H06116402 A | 4/1994 |
| JP | H07109580 A | 4/1995 |
| JP | H11250431 A | 9/1999 |
| JP | 2003129079 A | 5/2003 |
| JP | 200459658 A | 2/2004 |
| JP | 2004514687 A | 5/2004 |
| JP | 2004515564 A | 5/2004 |
| JP | 2004346091 A | 12/2004 |
| JP | 2008-013682 A | 1/2008 |
| JP | 2013254577 A | 12/2013 |
| WO | WO2004094575 A1 | 11/2004 |
| WO | WO2013183404 A1 | 12/2013 |

OTHER PUBLICATIONS

English Translation of International Search Report for Application No. PCT/JP2015/052425 dated Apr. 28, 2015, 3 pages.
Chinese Office Action and English Translation for Application No. 201580009567.8 dated Apr. 27, 2017, 14 pages.
German Office Action for Application No. DE112015000870.5 dated Apr. 24, 2018; 5 pages.
English Translation of German Office Action for Application No. DE112015000870.5 dated Apr. 24, 2018; 3 pages.

* cited by examiner

METAL SURFACE COATING COMPOSITION AND TERMINAL-EQUIPPED COVERED ELECTRICAL WIRE USING SAME

CROSS REFERENCE TO RELATED APPLICATIONS

This application claims the priority of Japanese patent application JP2014-029245 filed on Feb. 19, 2014, the entire contents of which are incorporated herein.

TECHNICAL FIELD

The present invention relates to a composition for a metal surface coating and a terminal-equipped covered electric wire using the same.

BACKGROUND ART

In a variety of metal parts and metal devices, surface coating agents are widely used for the purpose of lubrication and corrosion protection. For example, Patent Document 1 (JP-A-6-116402) discloses making a filler-containing polyamide imide resin coating agent adhere to a metal surface, and then baking the agent to form a stable film. Patent Document 2 (JP-A-11-250431) discloses coating a magnetic head slider with a solution of a metal alkoxide compound, and polymerizing the solution on the surface of the slider by heat treatment to form an oil repellent film. Patent Document 3 (JP-A-7-109580) discloses forming an organic silicon polymer or a metal alkoxide on a metal surface to impart excellent sliding properties to the metal surface.

Meanwhile, Patent Document 4 (JP-A-2004-515564) discloses oil that is made by mixing a plurality of fatty acid triglyceride derivatives and amide compounds. A metal surface is protected by coated with a certain amount of thus-prepared mixture as an oil component, whereby the lubricity of the metal surface is improved.

In addition, Patent Document 5 (JP-A-2002-514687) discloses forming a phosphate conversion coating on a metal substrate using a liquid composition containing water, a phosphoric acid ion, and an additive selected from a group consisting of a phosphoric acid ester and wax. In this case, the document describes that the phosphoric acid ester is used as a surfactant for the liquid composition containing water, and that the ester contains polyoxyethylene in the ester moiety.

SUMMARY OF INVENTION

The techniques of Patent Documents 1 to 3 require heat treatment to form coatings, and the formed coatings are hard, so that while being high in mechanical strength to improve the sliding properties, the coatings are likely to generate a defect such as a crack when the metal members on which the coatings are formed are deformed. Thus, these coatings cannot be applied as a surface coating that is intended for isolation of the metal members from the outside, for example, intended for corrosion protection. In addition, if used in electrical and electronic members, the coatings are apt to influence electrical contacts, and could cause a contact failure.

Meanwhile, the technique of Patent Document 4 does not require treatment such as heating, and can fulfill its function only by the coating. However, since the mixture is made of oil component, the adsorption force of the mixture to the metal surface is small. In addition, Patent Document 4 describes that the coating is used for temporal surface protection.

In addition, the technique of Patent Document 5 is merely forming the phosphoric acid coating on the metal substrate, and is intended to reduce the coefficient of friction by using the predetermined additive compared with a conventional phosphoric acid coating that does not contains the additive. Thus, the phosphoric acid coating is different from a coating agent mainly composed of oil.

It is an object of the present application to provide a composition for a metal surface coating that does not require a posttreatment such as heating, has flexibility to be able to follow deformation of a member to be coated, hardly peels off from a metal surface, and can be used for the purpose of corrosion protection, and provide a terminal-equipped covered electric wire using the same.

In order to solve the foregoing problem, the composition for a metal surface coating contains an adduct and a base oil, the adduct containing an acidic phosphate ester consisting of one or more kinds of compounds represented by General Formulae (1) and (2), and a metal,

$$P(=O)(-OR_1)(-OH)_2 \qquad (1)$$

$$P(=O)(-OR_1)_2(-OH) \qquad (2),$$

where $R_1$ represents a hydrocarbon group having 4 to 30 carbon atoms.

In this case, it is preferable that $R_1$ should have one or more branched chain structures, or one or more carbon-carbon double bond structures in the structure of the hydrocarbon group having 4 to 30 carbon atoms. In addition, it is preferable that $R_1$ should be at least one selected from the group consisting of an oleyl group, an isostearyl group, a 2-ethylhexyl group, a butyloctyl group, an isomyristyl group, an isocetyl group, a hexyldecyl group, an octyldecyl group, an octyldodecyl group, and an isobehenyl group.

It is preferable that the metal that forms the adduct with the acidic phosphate ester should be a divalent or higher-valent metal.

It is preferable that the metal that forms the adduct with the acidic phosphate ester should be at least one metal selected from the group consisting of an alkali metal, an alkaline earth metal, aluminum, titanium, and zinc. In this case, it is preferable that the alkaline earth metals should be at least one metal selected from the group consisting of calcium and magnesium.

It is preferable that the composition for a metal surface coating according to the present invention should have a pH of four or higher.

It is preferable that a percentage of the base oil to a total of the adduct containing the acidic phosphate ester and the metal and the base oil should be within the range of 30 to 99 mass %.

It is preferable that the base oil should have fluidity within the temperature range of 20 to 200° C.

In another aspect, a terminal-equipped covered electric wire includes a terminal metal fitting and an electric wire conductor, wherein an electric connecting section between the terminal metal fitting and the electric wire conductor is covered with the above-described composition for a metal surface coating.

Since the composition for a metal surface coating contains the adduct containing the specific acidic phosphate ester and the metal, and the base oil, the composition does not require a posttreatment such as heating, has flexibility to be able to follow deformation of a member to be coated, hardly peels off from a metal surface, and can be used for the purpose of corrosion protection. This can be assumed because the adduct containing the specific acidic phosphate ester and the metal is ionically bonded to a metal surface at its phosphate group (P—O⁻ group) and holds the base oil at the aliphatic hydrocarbon group of its ester moiety.

In this case, when $R_1$ has one or more branched chain structures, or one or more carbon-carbon double bond structures in the structure of the hydrocarbon group having 4 to 30 carbon atoms, the affinity between the hydrocarbon group and the base oil is more increased, which makes the base oil be less likely to flow out from a metal surface. In other words, the adduct containing the specific acidic phosphate ester and the metal is more excellent in the function of holding the base oil.

When the metal that forms the adduct with the acidic phosphate ester is a divalent or higher-valent metal, the acidic phosphate ester of two or more molecules forms an adduct via one metal, so that the molecular mass of the adduct is larger than an adduct containing a monovalent metal, and the flow temperature is increased, and the adduct can accordingly hold the base oil even at higher temperatures to be excellent in heat resistance.

When the metal that forms the adduct with the acidic phosphate ester is at least one metal selected from the group consisting of an alkali metal, an alkaline earth metal, aluminum, titanium, and zinc, the adduct has excellent adsorption properties to a metal surface. In addition, the metal has an ionization tendency higher than Sn, and thus has excellent ionic bonding properties to Sn. In this case, when the alkaline earth metal is at least one metal selected from the group consisting of calcium and magnesium, the adduct has excellent durability also after adsorption. This can be assumed because calcium salt or magnesium salt that is generated by interchange reaction with a surface metal at the time of adsorption has lower water solubility in a wide pH range, and thus hardly produces a fluid layer of an electrolyte over the surface on which the adduct is adsorbed especially even under high temperature and high humidity.

When the composition for a metal surface coating has a pH of four or higher, the composition can have excellent ionic bonding properties especially to a transition metal. In addition, the metal surface can be prevented from being corroded by the acidic phosphate ester.

When the percentage of the base oil to the total of the adduct containing the acidic phosphate ester and the metal and the base oil is 30 mass % or more, the amount of the base oil is sufficient, so that the composition for a metal surface coating is more excellent in the function of protecting the metal surface by forming an oil film. In addition, the composition can form a coating film that is more excellent in water resistance. When the percentage of the base oil is 99 mass % or less, the amount of the adduct containing the acidic phosphate ester and the metal is sufficient, so that the composition has an excellent ionic bonding force to the metal surface, and an excellent effect of maintaining the coating film on the metal surface. In addition, the composition is more excellent in the function of holding the base oil.

When the base oil has fluidity within the temperature range of 20 to 200° C., the composition for a metal surface coating can be easily liquefied, so that the composition is excellent in coating properties and adhesiveness.

Since the terminal-equipped covered electric wire includes the terminal metal fitting and the electric wire conductor, wherein the electric connecting section between the terminal metal fitting and the electric wire conductor is covered with the above-described composition for a metal surface coating, the covered electric wire exhibits corrosion protection performance that is stable over a long period of time.

DESCRIPTION OF EMBODIMENTS

Figure 1:
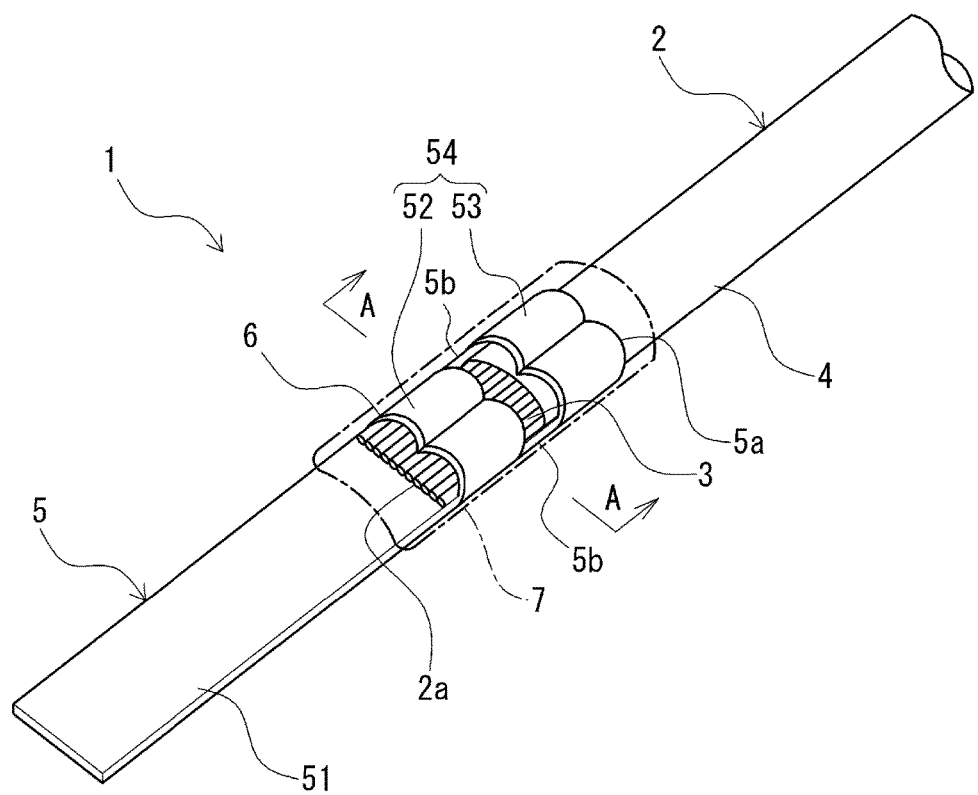
FIG. 1 is a perspective view of a terminal-equipped covered electric wire according to one embodiment of the present invention.

Next, a detailed description of one embodiment of the present invention will be provided.

The composition for a metal surface coating (hereinafter, referred to also as the present composition) contains an adduct and a base oil. The adduct contains an acidic phosphate ester consisting of one or more kinds of compounds represented by General Formulae (1) and (2), and a metal,

where $R_1$ represents a hydrocarbon group having 4 to 30 carbon atoms.

Examples of the acidic phosphoric acid ester in the present composition include an acidic phosphoric acid ester containing only a compound represented by General Formula (1), an acidic phosphoric acid ester containing only a compound represented by General Formula (2), and an acidic phosphoric acid ester containing both of a compound represented by General Formula (1) and a compound represented by General Formula (2).

The adduct containing the acidic phosphate ester and the metal in the present composition include an adduct containing only the compound represented by General Formula (1) and the metal, an adduct containing only the compound represented by General Formula (2) and the metal, and an adduct containing both of the adduct containing the compound represented by General Formula (1) and the metal and the adduct containing the compound represented by General Formula (2) and the metal.

A phosphate group (P—O⁻ group) in the adduct containing the acidic phosphate ester and the metal is ionically bonded to a metal surface to be coated with the present composition, and contributes to making a coating film made of the present composition adhere strongly to the metal surface. By containing the metal, the adduct improves ionic bonding properties of the phosphate group (P—O⁻ group) and promotes the ionic bonding. In addition, by containing the metal, the adduct has adherence properties. Further, by containing the metal, the adduct decreases the acidity of the acidic phosphate ester (increases the pH) to prevent the metal surface coated with the present composition from being corroded by the acidic phosphate ester.

As the metal that forms the adduct with the acidic phosphate ester, divalent or higher-valent metals are preferred from the viewpoint of having heat resistance, low fluidity, and the like.

Examples of the metal that forms the adduct with the acidic phosphate ester include alkali metals such as Li, Na, and K, alkaline earth metals such as Mg and Ca, aluminum, titanium, and zinc. One kind of these metals may be used alone or two or more kinds may be used in combination. Phosphoric acid ester salts of these metals have excellent adsorption properties to the metal surface. In addition, the metals have an ionization tendency higher than Sn, and thus have excellent ionic bonding properties to Sn. Among the metals, Ca and Mg are preferred from the viewpoint of water resistance.

In the adduct containing the acidic phosphate ester and the metal, $R_1$ in the ester moiety represents a hydrocarbon group having 4 to 30 carbon atoms. $R_1$ contributes to compatibility with the base oil that is a long-chain alkyl compound. In other words, $R_1$ has the function of holding the base oil in the present composition. The hydrocarbon group is an organic group composed of carbon and hydrogen, and does not contain a hetero element such as N, O, and S. An aliphatic hydrocarbon group and an alicyclic hydrocarbon group are preferred as $R_1$ from the viewpoint of compatibility with the base oil that is a long-chain alkyl compound. Among them, the aliphatic hydrocarbon group is preferred.

Examples of the aliphatic hydrocarbon group include an alkyl group composed of saturated hydrocarbon and an alkenyl group composed of unsaturated hydrocarbon. The aliphatic hydrocarbon group may be either of them. The alkyl group or the alkenyl group that is an aliphatic hydrocarbon group may have a straight chain structure or a branched chain structure. If the alkyl group is a straight chain alkyl group such as an n-butyl group and an n-octyl group, alkyl groups are easily oriented with each other to increase the crystallinity of the adduct containing the acidic phosphate ester and the metal, so that the compatibility with the base oil is likely to decrease. From this point of view, when an alkyl group is used as $R_1$, a branched chain alkyl group is preferably used to a straight chain alkyl group. Meanwhile, by having one or more carbon-carbon double bond structures, an alkenyl group is not high in crystallinity even if it is a straight chain alkenyl group, so that the alkenyl group may be a straight chain alkenyl group or a branched chain alkenyl group.

$R_1$ has 4 to 30 carbon atoms. An acidic phosphate ester in which $R_1$ has less than four carbon atoms has an inorganic nature, and is very likely to be crystallized. Thus, the compatibility with the base oil is not good, and the acidic phosphate ester is not mixed with the base oil. Meanwhile, the acidic phosphate ester in which $R_1$ has more than 30 carbon atoms is too high in viscosity, and cannot secure fluidity. From the viewpoint of compatibility, $R_1$ preferably has five or more carbon atoms, and more preferably has six or more carbon atoms. From the viewpoint of fluidity, $R_1$ preferably has 26 or less carbon atoms, and more preferably has 22 or less carbon atoms.

The adduct containing the acidic phosphate ester and the metal has both a phosphate group (polar group) and a nonpolar group (a hydrocarbon group in an ester moiety) in a molecule. The polar groups and the nonpolar groups can be present while being associated with each other in a layered state, so that the adduct can be made to be highly viscous liquid even though the adduct is a non-polymerized compound. Thus, the present composition that is a mixture with the base oil can be made to be viscous liquid. When applied on the metal surface, the present composition that is viscous liquid can be brought into more intimate contact with the metal surface by physical adsorption by van der Waals' forces. The viscosity properties are assumed to be obtained by entanglement among the molecular chains. Thus, from this point of view, the acidic phosphate ester is preferably designed not to have its crystallinity promoted. Specific examples of the design include adopting a hydrocarbon chain having 4 to 30 carbon atoms, adopting one or more branched chain structures or one or more carbon-carbon double bond structure.

The acidic phosphate ester needs to be contained in an adduct together with a metal from the viewpoint of adherence properties. When using an acidic phosphate ester itself, which is not contained in an adduct together with a metal, the polarity of the phosphate group is small, and the phosphate groups that define polar groups are low in associative properties (cohesive properties), and thus liquid having high viscosity properties cannot be obtained. For this reason, the adherence properties (viscosity properties) are low. In addition, even when the acidic phosphate ester is contained in an adduct together with ammonia or amine, the polarity of the phosphate group (amine salt) is small, and the phosphate groups (amine salts) that define polar groups are low in associative properties (cohesive properties), and thus liquid having high viscosity properties cannot be obtained. For this reason, the adherence properties (viscosity properties) are low.

Specific examples of $R_1$ include an oleyl group, a stearyl group, an isostearyl group, a 2-ethylhexyl group, a butyloctyl group, an isomyristyl group, an isocetyl group, a hexyldecyl group, an octyldecyl group, an octyldodecyl group, and an isobehenyl group. The types of $R_1$ may be same between the compound represented by General Formula (1) and the compound represented by General Formula (2), or may be different. From the viewpoint of easy preparation of the present composition, the types of $R_1$ are preferably same between the compound represented by General Formula (1) and the compound represented by General Formula (2).

Specific examples of the acidic phosphate ester include butyloctyl acid phosphate, isomyristyl acid phosphate, isocetyl acid phosphate, hexyl decyl acid phosphate, isostearyl acid phosphate, isobehenyl acid phosphate, octyl decyl acid phosphate, octyl dodecyl acid phosphate, isobutyl acid phosphate, 2-ethylhexyl acid phosphate, isodecyl acid phosphate, lauryl acid phosphate, tridecyl acid phosphate, stearyl acid phosphate, oleyl acid phosphate, myristyl acid phosphate, palmityl acid phosphate, dibutyloctyl acid phosphate, di-isomyristyl acid phosphate, di-isocetyl acid phosphate, di-hexyl decyl acid phosphate, di-isostearyl acid phosphate, di-isobehenyl acid phosphate, di-octyl decyl acid phosphate, di-octyl dodecyl acid phosphate, di-isobutyl acid phosphate, di-2-ethylhexyl acid phosphate, di-isodecyl acid phosphate, di-tridecyl acid phosphate, di-oleyl acid phosphate, di-myristyl acid phosphate, and di-palmityl acid phosphate. Among them, the oleyl acid phosphate, and the isostearyl acid phosphate are preferred from the viewpoint of non-crystallinity and molecular chain entanglement properties with the base oil.

The present composition may partially contain an acidic phosphate ester itself, which is not contained in an adduct together with a metal, only if containing an adduct containing the specific acidic phosphate ester and a metal. However, in the present composition, when the ratio of the acidic phosphate ester itself increases, the ionic bonding properties are lowered, the adherence properties (viscosity properties) are lowered, and the effect of preventing corrosion is decreased. For these reasons, the ratio of the acidic phosphate ester itself is preferably smaller.

Examples of an index for measuring the ratio of the acidic phosphate ester itself includes measuring the pH of the present composition. When the ratio of the acidic phosphate ester increases, the amount of the residual phosphate group (P—OH group) increases, and the acidity becomes higher (the pH decreases). When the ratio of the acidic phosphate ester decreases, the amount of the residual phosphate group (P—OH group) decreases, and the acidity becomes lower (the pH increases). The pH of the present composition is preferably four or higher, and more preferably 5.5 or higher.

In addition, the ratio (molar ratio) of the acidic phosphate ester and the metal can be indicated by the value of f when assuming that $f=1\times x-m\times y$, where the valency of the acidic phosphate ester is $x^-$, the valency of the metal is $y^+$, the molar amount of the acidic phosphate ester is 1, and the molar amount of the metal is m. Within the range of $f>0$, the acidic phosphate ester is in excess of the metal, and the phosphate group (P—OH group) remains. When $f=0$, the acidic phosphate ester is equimolar to the metal, and no phosphate group (P—OH group) remains. In addition, when $f<0$, the acidic phosphate ester is insufficient for the metal, and no phosphate group (P—OH group) remains. In order to increase the pH of the present composition to improve the adherence properties of the present composition, it is preferable that $f \leq 0$.

A base oil having fluidity at room temperature or at high temperatures can be used as the base oil. The base oil has fluidity preferably within the temperature range of 20 to 200° C., and more preferably within the temperature range of 30 to 150° C. Thus, the entire composition is easily liquefied to be excellent in coating properties and adhesiveness.

Specific examples of the base oil include alkyl benzene, alkyl naphthalene, polybutene, mineral oil, synthetic oil, petroleum jelly, wax, synthetic ester, fat and oil, silicone oil, polyglycol, normal paraffin, isoparaffin, polyether, and a blend oil consisting of two or more of these oils. Among them, the mineral oil and the paraffin are preferred from the viewpoint of thermal stability.

The content of the base oil, as a percentage of the base oil to the total of the adduct containing the acidic phosphate ester and the metal and the base oil, is preferably 30 mass % or more, and more preferably 40 mass % or more. When the content of the base oil is 30 mass % or more, the amount of the base oil is sufficient, and the present composition is more excellent in the function of protecting the metal surface by forming an oil film. In addition, the present composition forms a coating film that is more excellent in water resistance. On the other hand, the content of the base oil is preferably 99 mass % or less, and more preferably 96 mass % or less. When the content of the base oil is 99 mass % or less, the amount of the adduct containing the acidic phosphate ester and the metal is sufficient, so that the present composition has an excellent ionic bonding force to the metal surface to be coated with the present composition, and an excellent effect of maintaining the coating film on the metal surface. In addition, the present composition is more excellent in the function of holding the base oil in the present composition.

A stabilizing agent, an anticorrosive agent, a pigment, a thickening agent, a filler, and the like can be added to the present composition in addition to the adduct containing the acidic phosphate ester and the metal and the base oil within a range of not impairing the functions of the present composition.

The present composition may further contain a solvent. The solvent is preferably used from the viewpoint of enhancing the coating properties of the present composition when applying the present composition to the metal surface, and from the viewpoint of securing the coating properties of the present composition at low temperatures such as room temperature. The solvent may be a non-volatile solvent that remains in a coat formed by coating the metal surface with the present composition to become a part of the coat, or may be a volatile solvent that volatilizes and does not remain in the coat and does not become a part of the coat. Examples of the non-volatile solvent include liquid paraffin (synthetic oil) and mineral oil. Examples of the volatile solvent include low molecular alkane such as hexane and isooctane, an aromatic solvent such as toluene and xylene, relatively low-polar alcohol such as benzyl alcohol and lauryl alcohol, an ether solvent such as tetrahydrofuran (THF) and ethylene glycol, a ketone solvent such as methyl ethyl ketone (MEK) and methyl isobutyl ketone (MIBK), an ester solvent such as ethyl acetate and butyl acetate, and a halogenous solvent such as chloroform and dichloroethane. Among these solvents, synthetic oil, isooctane, toluene, and benzyl alcohol are preferred from the viewpoint of dispersibility and solubility in the base oil.

The present composition is preferably in a liquid form (or exhibits fluidity) within the temperature range of 20 to 200° C. from the viewpoint of excellent coating properties when the present composition is applied to the metal surface. For example, the present composition is in a liquid form (or exhibits fluidity) within the above-described temperature range to be enabled to be easily applied on the metal surface under the condition that the base oil has fluidity within the temperature range of 20 to 200° C., the condition that the crystallinity of the adduct containing the acidic phosphate ester and the metal is low, the condition that the compatibility between the adduct containing the acidic phosphate ester and the metal and the base oil is excellent.

The film thickness of the present composition applied to the metal surface is preferably 100 μm or less, and more preferably 50 μm or less from the viewpoint of preventing the present composition from flowing out or leaking out of coating spots. Meanwhile, the film thickness is preferably a given thickness or more from the viewpoint of the mechanical strength of the coating film. Examples of the lower limit of the film thickness include 0.5 μm, 2 μm, and 5 μm.

The present composition can be easily obtained by simply mixing the adduct containing the acidic phosphate ester and the metal, the base oil, and ingredients added as necessary. A coating film made of the present composition can be easily formed on a metal surface by coating the metal surface with the present composition or immersing a metal material in the present composition. The coating film formed on the metal surface using the present composition need not be cured especially, and need not to be subjected to a posttreatment such as heating. In addition, consisting of the above-described ingredients, the present composition has flexibility to be able to follow deformation of a member to be coated, hardly peels off from the metal surface, and can be used for the purpose of corrosion protection. The reason why the present composition hardly peels off the metal surface can be assumed that the adduct containing the specific acidic phosphate ester and the metal is ionically bonded to the metal surface at its phosphate group (P—O$^-$ group) and holds the base oil at the aliphatic hydrocarbon group of its ester moiety.

The present composition can be used for the purpose of lubrication or corrosion protection. Examples of the use for corrosion protection include using an anticorrosive agent for a terminal-equipped covered electric wire.

Next, a description of a terminal-equipped covered electric wire will be provided.

The terminal-equipped covered electric wire includes a terminal metal fitting and an insulated electric wire, the terminal metal fitting being connected to the end of a conductor of the insulated electric wire, where an electric connecting section between the terminal metal fitting and the electric wire conductor is covered with the present composition. Thus, the electric connecting section can be prevented from being corroded.

Figure 2:
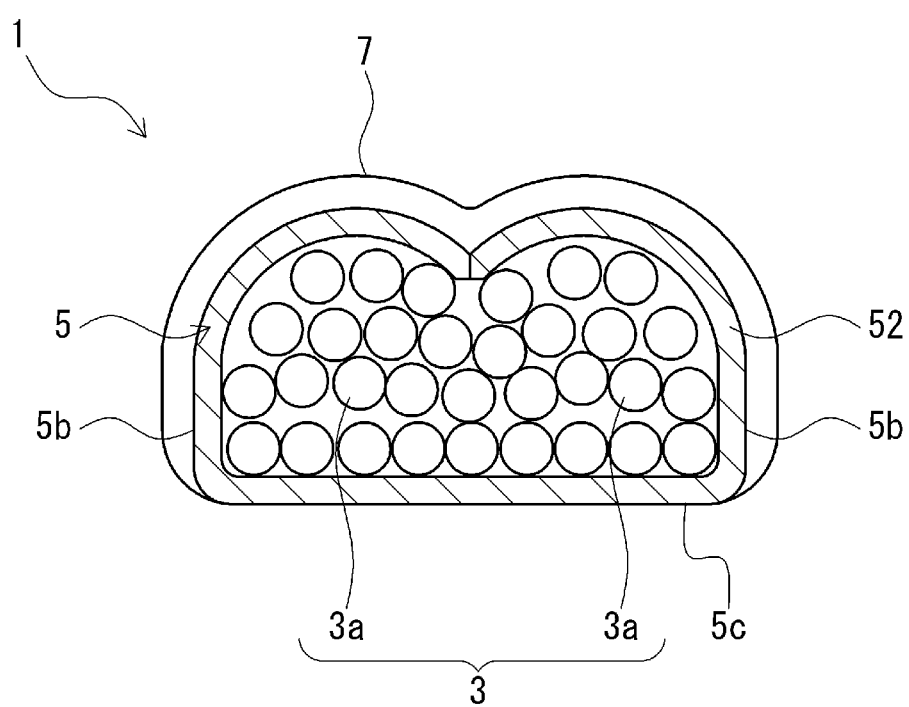
FIG. 2 is a longitudinal sectional view of the terminal-equipped covered electric wire taken along the line A-A of FIG. 1.

FIG. 1 is a perspective view of a terminal-equipped covered electric wire according to one embodiment. FIG. 2 is a longitudinal sectional view of the terminal-equipped covered electric wire taken along the line A-A of FIG. 1. As shown in FIGS. 1 and 2, a terminal-equipped covered electric wire 1 has a configuration that electric wire conductors 3 of a covered electric wire 2 that is covered with an insulating covering (an insulator) 4 are electrically connected to a terminal metal fitting 5 by an electric connecting section 6.

The terminal metal fitting 5 includes a tab-like connecting portion 51 made of a long and thin flat plate that is to be connected to a counterpart terminal, and a wire fixing portion 54 that includes a wire barrel 52 extending and provided to an end portion of the connecting portion 51 and an insulation barrel 53. The terminal metal fitting 5 can be formed (worked on) into a predetermined shape by pressing a metal plate.

The electric wire conductors 3 are exposed at the electric connecting section 6 by stripping off the insulating covering 4 at the end of the covered electric wire 2, and the exposed electric wire conductors 3 are crimped onto one surface of the terminal metal fitting 5, whereby the covered electric wire 2 is connected to the terminal metal fitting 5. The wire barrel 52 of the terminal metal fitting 5 is swaged on the electric wire conductors 3 of the covered electric wire 2, whereby the electric wire conductors 3 are electrically connected to the terminal metal fitting 5. In addition, the insulation barrel 53 of the terminal metal fitting 5 is swaged on the insulating covering 4 of the covered electric wire 2.

In the terminal-equipped covered electric wire 1, the region indicated with the dashed line is covered with a coating film 7 made of the present composition. To be specific, the region ranging from the top surface of the terminal metal fitting 5 at a portion that is more in front than the distal end of the exposed portion of the electric wire conductors 3 that is exposed from the insulating covering 4 to the top surface of the insulating covering 4 at a portion that is more behind than the rear end of the exposed portion of the electric wire conductors 3 that is exposed from the insulating covering 4 is covered with the coating film 7. That is, the covered electric wire 2 is covered with the coating film 7 such that on the side of a distal end 2a, the coating film 7 slightly extends off toward the connecting portion 51 of the terminal metal fitting 5 from the distal end of the electric wire conductors 3. The terminal metal fitting 5 is covered with the coating film 7 such that on the side of a distal end 5a, the coating film 7 slightly extends off toward the insulating covering 4 of the covered electric wire 2 from the end portion of the insulation barrel 53. As shown in FIG. 2, side surfaces 5b of the terminal metal fitting 5 are also covered with the coating film 7. It is to be noted that a back surface 5c of the terminal metal fitting 5 may not covered with the coating film 7 or may be covered with the coating film 7. The circumferential end of the coating film 7 includes a portion being in contact with the surface of the terminal metal fitting 5, a portion being in contact with the surface of the electric wire conductors 3, and a portion being in contact with the surface of the insulating covering 4.

Thus, the electric connecting section 6 is covered with the coating film 7 of a predetermined thickness along the shape of the outer circumference of the terminal metal fitting 5 and the covered electric wire 2. Consequently, the exposed portion of the electric wire conductors 3 of the covered electric wire 2 is completely covered with the coating film 7, and is not exposed to the outside. Thus, the electric connecting section 6 is completely covered with the coating film 7. The coating film 7 has excellent adhesiveness with any of the electric wire conductors 3, the insulating covering 4, and the terminal metal fitting 5, so that the coating film 7 prevents water or the like from getting into the electric wire conductors 3 and the electric connecting section 6 from the outside to corrode the metal portions. In addition, since the coating film 7 has excellent adhesiveness, even when the electric wire is bent, for example, during the process of manufacturing a wire harness to attaching the wire harness to a vehicle, clearance is hardly created any of between the coating film 7 and the electric wire conductors 3, between the coating film 7 and the insulating covering 4, and between the coating film 7 and the terminal metal fitting 5 at the circumferential end of the coating film 7, and thus the waterproof properties and the anticorrosion function can be maintained.

The present composition for forming the coating film 7 is applied in a predetermined range. Known means such as an instillation method and a coating method can be used for applying the present composition for forming the coating film 7. In applying the present composition for forming the coating film 7, the temperature may be adjusted by heating, cooling, or the like.

The present composition for forming the coating film 7 of a predetermined thickness is applied in a predetermined range. The thickness is preferably within the range of 0.01 to 0.1 mm. When the present composition for forming the coating film 7 is too thick, the terminal metal fitting 5 cannot be easily inserted into a connector. When the present composition for forming the coating film 7 is too thin, the corrosion protection performance is likely to decrease.

The electric wire conductors 3 of the covered electric wire 2 define a strand made by stranding a plurality of elemental wires 3a. The strand may consist of one kind of metal elemental wires, or may consist of two or more kinds of metal elemental wires. In addition, the strand may include elemental wires made of organic fibers in addition to the metal elemental wires. It is to be noted that consisting of one kind of metal elemental wires defines consisting of metal elemental wires all of which, constituting the strand, are made from a same metal material, and consisting of two or more kinds of metal elemental wires defines consisting of metal elemental wires including metal elemental wires made from different metal materials in the strand. The strand may include a reinforcing wire (tension member) or the like for reinforcing the covered electric wire 2.

Examples of the material for the metal elemental wires constituting the electric wire conductors 3 include copper, a copper alloy, aluminum, an aluminum alloy, and materials prepared by subjecting the above-described materials to a variety of plating. Examples of the material for the metal elemental wire as a reinforcing wire include a copper alloy, titanium, tungsten, and stainless steel. Examples of the material for the organic fiber as a reinforcing wire include Kevlar. As the material for the metal elemental wires constituting the electric wire conductors 3, aluminum, an aluminum alloy, and materials prepared by subjecting these materials to a variety of plating are preferred from the viewpoint of weight reduction.

Examples of the material for the insulating covering 4 include rubber, polyolefin, PVC, and a thermoplastic elastomer. These materials may be used alone or two or more kinds may be used in combination. A variety of additives may be added to the material for the insulating covering 4 as appropriate. Examples of the additives include a flame retardant, a filler, and a coloring agent.

Examples of the material for the terminal metal fitting 5 (the material for the base material) include commonly-used brass, various kinds of copper alloys, and copper. A part of the surface of the terminal metal fitting 5 (e.g., a contact point) or the entire surface may be plated with various kinds of metals such as tin, nickel, and gold.

It is to be noted that while in the terminal-equipped covered electric wire 1 shown in FIG. 1, the terminal metal fitting is connected to the end of the electric wire conductors by a crimp connection method, the terminal metal fitting may be connected be the end of the electric wire conductors by a known electric connection method instead of the crimp connection method.

EXAMPLES

Hereinafter, a description will be provided with reference to examples; however, the present invention is not limited to the examples.

Synthesis of the Adhesive Compositions

Synthesis Example 1: OL-Li 50 g (acid value of 0.163 mol) of oleyl acid phosphate ("Phoslex A18D" manufactured by SC ORGANIC CHEMICAL CO., LTD., molecular mass of 467 (average), acid value of 183 mg KOH/g) and 50 mL of methanol were placed in a 500 mL flask, and were stirred at 50° C. to yield a uniform solution. A solution obtained by dissolving 6.84 g (0.163 mol) of lithium hydroxide monohydrate anhydrous in 50 mL of methanol was gradually added thereto. The resulting clear solution was stirred for 30 minutes while keeping the temperature at 50° C., and then the methanol and the generated water were distilled off under reduced pressure using a rotary evaporator. Then, after the addition of 50 mL of toluene, the mixture was distilled in the same manner to distill the generated water off by azeotrope, and then the product of interest that was a clear viscous substance was obtained.

Synthesis Example 2: OL-Ca 50 g (acid value of 0.163 mol) of oleyl acid phosphate ("Phoslex A18D" manufactured by SC ORGANIC CHEMICAL CO., LTD., molecular mass of 467 (average), acid value of 183 mg KOH/g) and 50 mL of methanol were placed in a 500 mL flask, and were stirred at room temperature to yield a uniform solution. 6.04 g (0.0815 mol) of calcium hydroxide was added thereto, and the resulting suspension was stirred for 24 hours while being kept at room temperature. After it was confirmed that a deposition of the calcium hydroxide disappeared, the mixture was filtered, and then the methanol and the generated water were distilled off under reduced pressure using a rotary evaporator. Then, after the addition of 50 mL of toluene, the mixture was distilled in the same manner to distill the generated water off by azeotrope, and then the product of interest that was a clear viscous substance was obtained.

Synthesis Example 3: IS-Li

The product of interest that was a clear viscous substance was obtained in the same manner as in Synthesis Example 1, except that 50 g (acid value of 0.159 mol) of isostearyl acid phosphate ("Phoslex A18OL" manufactured by SC ORGANIC CHEMICAL CO., LTD., molecular mass of 487 (average), acid value of 178 mg KOH/g) was used instead of oleyl acid phosphate, and 6.67 g (0.159 mol) of lithium hydroxide monohydrate anhydrous was added thereto.

Synthesis Example 4: IS-Ca

The product of interest that was a clear viscous substance was obtained in the same manner as in Synthesis Example 2, except that 50 g (acid value of 0.159 mol) of isostearyl acid phosphate ("Phoslex A18OL" manufactured by SC ORGANIC CHEMICAL CO., LTD., molecular mass of 487 (average), acid value of 178 mg KOH/g) was used instead of oleyl acid phosphate, and 5.89 g (0.0795 mol) of calcium hydroxide was added thereto.

Synthesis Example 5: IS-Mg

The product of interest that was a clear viscous substance was obtained in the same manner as in Synthesis Example 4, except that 4.64 g (0.0795 mol) of magnesium hydroxide was added thereto instead of 5.89 g (0.0795 mol) of calcium hydroxide.

Synthesis Example 6: IS-Zn

The product of interest that was a clear viscous substance was obtained in the same manner as in Synthesis Example 4, except that 8.73 g (0.0795 mol as Zn) of basic zinc carbonate was added thereto instead of 5.89 g (0.0795 mol) of calcium hydroxide.

Synthesis Example 7: IS-Al

The product of interest that was a clear viscous substance was obtained in the same manner as in Synthesis Example 3, except that 10.83 g (0.053 mol) of aluminum isopropoxide was added thereto instead of the lithium hydroxide monohydrate anhydrous/methanol solution.

Synthesis Example 8: EH-Li

The product of interest that was a clear viscous substance was obtained in the same manner as in Synthesis Example 3, except that 50 g (acid value of 0.153 mol) of di-2-ethylhexyl acid phosphate ("Phoslex A-208" manufactured by SC ORGANIC CHEMICAL CO., LTD., molecular mass of 322 (average), acid value of 172 mg KOH/g) was used instead of isostearyl acid phosphate, and 6.42 g (0.153 mol) of lithium hydroxide monohydrate anhydrous was added thereto.

Synthesis Example 9: EH-Ca

The product of interest that was a clear viscous substance was obtained in the same manner as in Synthesis Example 4, except that 50 g (acid value of 0.153 mol) of di-2-ethylhexyl acid phosphate ("Phoslex A-208" manufactured by SC ORGANIC CHEMICAL CO., LTD., molecular mass of 322 (average), acid value of 172 mg KOH/g) was used instead of isostearyl acid phosphate, and 5.67 g (0.076 mol) of calcium hydroxide was added thereto.

Synthesis Example 10: EH-Mg

The product of interest that was a clear viscous substance was obtained in the same manner as in Synthesis Example 5, except that 50 g (acid value of 0.153 mol) of di-2-ethylhexyl acid phosphate ("Phoslex A-208" manufactured by SC ORGANIC CHEMICAL CO., LTD., molecular mass of 322 (average), acid value of 172 mg KOH/g) was used instead of isostearyl acid phosphate, and 4.46 g (0.076 mol) of magnesium hydroxide was added thereto.

Synthesis Example 11: EH-Zn

The product of interest that was a clear viscous substance was obtained in the same manner as in Synthesis Example 6, except that 50 g (acid value of 0.153 mol) of di-2-ethylhexyl acid phosphate ("Phoslex A-208" manufactured by SC ORGANIC CHEMICAL CO., LTD., molecular mass of 322 (average), acid value of 172 mg KOH/g) was used instead of isostearyl acid phosphate, and 8.34 g (0.076 mol as Zn) of basic zinc carbonate was added thereto.

Synthesis Example 12: EH-Al

The product of interest that was a clear viscous substance was obtained in the same manner as in Synthesis Example 7, except that 50 g (acid value of 0.153 mol) of di-2-ethylhexyl acid phosphate ("Phoslex A-208" manufactured by SC ORGANIC CHEMICAL CO., LTD., molecular mass of 322 (average), acid value of 172 mg KOH/g) was used instead of isostearyl acid phosphate, and 10.4 g (0.051 mol) of aluminum isopropoxide was added thereto.

Synthesis of Comparative Compositions

Synthesis Example 13: MT-Li

The product of interest was obtained in the same manner as in Synthesis Example 1, except that 25 g (acid value of 0.315 mol) of methyl acid phosphate ("Phoslex A-1" manufactured by SC ORGANIC CHEMICAL CO., LTD., molecular mass of 119 (average), acid value of 707 mg KOH/g) was used instead of oleyl acid phosphate, and 13.2 g (0.315 mol) of lithium hydroxide monohydrate anhydrous was added thereto.

Synthesis Example 14: MT-Ca

The product of interest was obtained in the same manner as in Synthesis Example 2, except that 25 g (acid value of 0.315 mol) of methyl acid phosphate ("Phoslex A-1" manufactured by SC ORGANIC CHEMICAL CO., LTD., molecular mass of 119 (average), acid value of 707 mg KOH/g) was used instead of oleyl acid phosphate, and 11.67 g (0.157 mol) of calcium hydroxide was added thereto.

Preparation of Compositions for a Metal Surface Coating

Compositions for a metal surface coating were prepared by mixing the compositions obtained by the Synthesis Examples 1 to 14 and the base oils at predetermined ratios. The types of the base oils and the mixing ratios are shown in Tables 1 and 2. It is to be noted that the compositions for a metal surface coating according to Comparative Examples 1 to 2 are made only of the base oils.

PA5: "UNIPRESS PA5" manufactured by JX NIPPON OIL & ENERGY CORPORATION
YUBASE: "YUBASE8" (liquid paraffin) manufactured by EXXON MOBIL CORPORATION
PAO: "SPECTTRASYN40" (poly alpha olefin) manufactured by EXXON MOBIL CORPORATION Evaluations of Oil Film Residual Performance Tin-plated copper plates and copper plates were immersed in the prepared compositions for a metal surface coating at 50° C. under warming, and irradiated with ultrasonic waves at 50° C. for five minutes with the use of an ultrasonic washing machine. Then, the tin-plated copper plates and the copper plates that were immersed in the prepared compositions for a metal surface coating were taken out, made to stand vertically in a constant-temperature chamber of 40° C. to uniformize the surfaces of the tin-plated copper plates and the copper plates, and left for two hours. Then, the tin-plated copper plates and the copper plates taken out of the constant-temperature chamber were placed horizontally, and a water droplet of 10 μL of pure water was gently dropped on each of the coated surfaces coated with the compositions for a metal surface coating at room temperature of 20° C. After the tin-plated copper plates and the copper plates were placed calmly as they were for five minutes, the contact angles of the water droplets on the coated surfaces were measured, and evaluations of the oil film residual performance were performed based on the values of the water contact angles.

The water contact angles of an untreated tin-plated copper plate and an untreated copper plate that were not surface treated with the compositions for a metal surface coating were both about 40 degrees. When water the contact angle was larger than this value, a hydrophobic substance could be judged to reside (an oil film could be judged to reside) on the metal surface. When the water contact angle was larger than 60 degrees or more, an oil film was judged to sufficiently reside on the metal surface.

Evaluations of oil film residual performance were performed under three conditions: an evaluation after left in the constant-temperature chamber for two hours, an evaluation after hot water treatment, and an evaluation after heat treatment.

The hot water treatment was performed by washing the tin-plated copper plates and the copper plates that were taken out of the constant-temperature chamber in stirred hot water of 80° C. for one hour, and then the tin-plated copper plates and the copper plates were air-dried overnight.

The heat treatment was performed by vertically standing the tin-plated copper plates and the copper plates that were taken out of the constant-temperature chamber in an oven of 120° C., and heating them for 48 hours.

Measurement of pH

The pH of each composition was measured. Each composition was suspended in pure water in a proportion of about 3% (w/v) by ultrasonic irradiation, and the pH of the suspension was measured using a pH meter equipped with a glass electrode.

TABLE 1

| | | Synthesis Example | pH | Example | | | | | | | | | | | |
|---|---|---|---|---|---|---|---|---|---|---|---|---|---|---|---|
| | | | | 1 | 2 | 3 | 4 | 5 | 6 | 7 | 8 | 9 | 10 | 11 | 12 |
| Adhesive composition | OL-Li | 1 | 7.2 | 20 | | | | | | | | | | | |
| | OL-Ca | 2 | 7.3 | | 20 | | | | | | | | | | |

TABLE 1-continued

| | Synthesis Example | | pH | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|---|---|
| | IS-Li | 3 | 7.3 | | | 20 | | | | | | | | | |
| | IS-Ca | 4 | 7.2 | | | | 20 | | | | | | | | |
| | IS-Mg | 5 | 7.4 | | | | | 20 | | | | | | | |
| | IS-Zn | 6 | 7.3 | | | | | | 20 | | | | | | |
| | IS-Al | 7 | 7.1 | | | | | | | 20 | | | | | |
| | EH-Li | 8 | 7.2 | | | | | | | | 20 | | | | |
| | EH-Ca | 9 | 7.2 | | | | | | | | | 20 | | | |
| | EH-Mg | 10 | 7.1 | | | | | | | | | | 20 | | |
| | EH-Zn | 11 | 7.3 | | | | | | | | | | | 20 | |
| | EH-Al | 12 | 7.4 | | | | | | | | | | | | 20 |
| Comparative composition | MT-Li | 13 | 7.1 | | | | | | | | | | | | |
| | MT-Ca | 14 | 7.3 | | | | | | | | | | | | |
| Base oil | Nujol | | | 80 | 80 | 80 | 80 | 80 | 80 | 80 | 80 | 80 | 80 | 80 | 80 |
| | PA5 | | | | | | | | | | | | | | |
| | YUBASE | | | | | | | | | | | | | | |
| | PAO | | | | | | | | | | | | | | |
| Water contact angle (°) Tin-plated copper plate | After left for two hours | | | 92 | 91 | 91 | 93 | 95 | 96 | 94 | 94 | 95 | 98 | 95 | 91 |
| | After hot water treatment | | | 88 | 89 | 89 | 90 | 91 | 94 | 91 | 90 | 91 | 90 | 92 | 90 |
| | After heat treatment | | | 89 | 90 | 89 | 90 | 91 | 94 | 92 | 90 | 92 | 92 | 91 | 90 |
| Water contact angle (°) Copper plate | After left for two hours | | | 92 | 92 | 92 | 84 | 96 | 96 | 92 | 92 | 95 | 95 | 94 | 91 |
| | After hot water treatment | | | 90 | 91 | 89 | 90 | 91 | 94 | 90 | 89 | 92 | 92 | 90 | 89 |
| | After heat treatment | | | 89 | 90 | 91 | 91 | 91 | 92 | 92 | 90 | 93 | 92 | 94 | 91 |

| | Synthesis Example | | pH | Example 13 | 14 | 15 | 16 | 17 | 18 | 19 | 20 | 21 | 22 | 23 | 24 |
|---|---|---|---|---|---|---|---|---|---|---|---|---|---|---|---|
| Adhesive composition | OL-Li | 1 | 7.2 | | | | | | | | | | | | |
| | OL-Ca | 2 | 7.3 | | | | | | | | | | | | |
| | IS-Li | 3 | 7.3 | | | | | | | | | | | | |
| | IS-Ca | 4 | 7.2 | 20 | 20 | 20 | | | | 2 | 10 | 70 | | | |
| | IS-Mg | 5 | 7.4 | | | | | | | | | | | | |
| | IS-Zn | 6 | 7.3 | | | | | | | | | | | | |
| | IS-Al | 7 | 7.1 | | | | | | | | | | | | |
| | EH-Li | 8 | 7.2 | | | | | | | | | | | | |
| | EH-Ca | 9 | 7.2 | | | | | | | | | | | | |
| | EH-Mg | 10 | 7.1 | | | | | | | | | | | | |
| | EH-Zn | 11 | 7.3 | | | | 20 | 20 | 20 | | | | 20 | 10 | 70 |
| | EH-Al | 12 | 7.4 | | | | | | | | | | | | |
| Comparative composition | MT-Li | 13 | 7.1 | | | | | | | | | | | | |
| | MT-Ca | 14 | 7.3 | | | | | | | | | | | | |
| Base oil | Nujol | | | | | | | | | 98 | 90 | 30 | 98 | 90 | 30 |
| | PA5 | | | 80 | | | 80 | | | | | | | | |
| | YUBASE | | | | 80 | | | 80 | | | | | | | |
| | PAO | | | | | 80 | | | 80 | | | | | | |
| Water contact angle (°) Tin-plated copper plate | After left for two hours | | | 89 | 92 | 96 | 90 | 91 | 94 | 92 | 93 | 84 | 93 | 94 | 85 |
| | After hot water treatment | | | 88 | 86 | 94 | 88 | 87 | 90 | 81 | 89 | 81 | 81 | 90 | 81 |
| | After heat treatment | | | 65 | 91 | 92 | 88 | 90 | 91 | 83 | 90 | 81 | 81 | 90 | 81 |
| Water contact angle (°) Copper plate | After left for two hours | | | 87 | 92 | 95 | 90 | 90 | 94 | 93 | 93 | 84 | 93 | 95 | 85 |
| | After hot water treatment | | | 85 | 91 | 94 | 86 | 86 | 91 | 81 | 90 | 80 | 81 | 88 | 82 |
| | After heat treatment | | | 88 | 91 | 92 | 88 | 87 | 91 | 88 | 91 | 81 | 85 | 90 | 84 |

TABLE 2

| | Synthesis Example | | pH | Comparative Example 1 | 2 | 3 | 4 |
|---|---|---|---|---|---|---|---|
| Adhesive composition | OL-Li | 1 | 7.2 | | | | |
| | OL-Ca | 2 | 7.3 | | | | |
| | IS-Li | 3 | 7.3 | | | | |
| | IS-Ca | 4 | 7.2 | | | | |
| | IS-Mg | 5 | 7.4 | | | | |
| | IS-Zn | 6 | 7.3 | | | | |
| | IS-Al | 7 | 7.1 | | | | |
| | EH-Li | 8 | 7.2 | | | | |
| | EH-Ca | 9 | 7.2 | | | | |
| | EH-Mg | 10 | 7.1 | | | | |
| | EH-Zn | 11 | 7.3 | | | | |
| | EH-Al | 12 | 7.4 | | | | |
| Comparative composition | MT-Li | 13 | 7.1 | | | 20 | |
| | MT-Ca | 14 | 7.3 | | | | 20 |
| Base oil | Nujol | | | 100 | | 80 | 80 |
| | PA5 | | | | 100 | | |
| | YUBASE | | | | | | |
| | PAO | | | | | | |
| Water contact angle (°) Tin-plated copper plate | After left for two hours | | | 72 | 70 | 81 | 90 |
| | After hot water treatment | | | 38 | 30 | 28 | 47 |
| | After heat treatment | | | 45 | 49 | 58 | 47 |
| Water contact angle (°) Copper plate | After left for two hours | | | 68 | 69 | 88 | 91 |
| | After hot water treatment | | | 42 | 38 | 37 | 46 |
| | After heat treatment | | | 50 | 42 | 58 | 59 |

The compositions of Examples 1 to 24 maintain water contact angles of 60 degrees or more even after the hot water treatment and the heat treatment, so that it is found that the compositions for a metal surface coating (oil films) sufficiently reside on the metal surfaces. Thus, according to the compositions for a metal surface coating, the coating of oil films can be easily applied on the metal surfaces by immersion or the like, and the oil films can be held on the metal surfaces continuously even under a high temperature condition, or under a high temperature and high humidity condition. Thus, it is shown that the compositions for a metal surface coating have excellent durability.

Meanwhile, the compositions of Comparative Examples 1 and 2 that are applied on the metal surfaces do not contain the adduct containing the acidic phosphate ester and the metal, but contains only the base oils, so that the decreases in the water contact angles that indicate reduction of the base oils are seen from the stage where the compositions are left in the constant-temperature chamber to uniformize the oil films. The decreases in the water contact angles are outstanding after the hot water treatment or the heat treatment, which indicates that most of the base oils have flowed out of the metal surfaces.

The compositions of Comparative Examples 3 and 4 that are applied on the metal surfaces contain the adduct containing the acidic phosphate ester and the metal, but the hydrocarbon groups in the ester moieties of the acidic phosphate esters define methyl groups that have less carbon atoms. Thus, the compatibility between the adducts containing the acidic phosphate ester and the metal and the base oils is low, and the adducts are assumed to have a low function of holding the base oils. Thus, while the decreases in the water contact angles that are not significant at the stage where the compositions are left in the constant-temperature chamber to uniformize the oil films, the decreases in the water contact angles are outstanding after the hot water treatment or the heat treatment, which indicates that most of the base oils have flowed out of the metal surfaces.

While the embodiment has been described in detail, the present invention is not limited to the above-described embodiment, and various modifications can be made without departing from the gist of the present invention.

The invention claimed is:

1. A terminal-equipped covered electric wire comprising a terminal metal fitting and an insulated electric wire, the terminal metal fitting being connected to an end of a conductor of the insulated electric wire, wherein an electric connecting section between the terminal metal fitting and the electric wire conductor is covered with a composition for a metal surface coating, the composition comprising an adduct and a base oil, the adduct comprising:

an acidic phosphate ester comprising one or more kinds of compounds represented by General Formulae (1) and (2); and
a metal, $$P(=O)(-OR_1)(-OH)_2 \quad (1)$$

$$P(=O)(-OR_1)_2(-OH) \quad (2),$$

where $R_1$ represents a hydrocarbon group having 4 to 30 carbon atoms.

2. The terminal-equipped covered electric wire according to claim 1, wherein $R_1$ has one or more branched chain structures, or one or more carbon-carbon double bond structures in the structure of the hydrocarbon group having 4 to 30 carbon atoms.

3. The terminal-equipped covered electric wire according to claim 1, wherein $R_1$ comprises at least one selected from the group consisting of an oleyl group, an isostearyl group, a 2-ethylhexyl group, a butyloctyl group, an isomyristyl group, an isocetyl group, a hexyldecyl group, an octyldecyl group, an octyldodecyl group, and an isobehenyl group.

4. The terminal-equipped covered electric wire according to claim 1, wherein the metal that forms the adduct with the acidic phosphate ester is a divalent or higher-valent metal.

5. The terminal-equipped covered electric wire according to claim 1, wherein the metal that forms the adduct with the acidic phosphate ester comprises at least one metal selected from the group consisting of an alkali metal, an alkaline earth metal, aluminum, titanium, and zinc.

6. The terminal-equipped covered electric wire according to claim 5, wherein the alkaline earth metal comprises at least one metal selected from the group consisting of calcium and magnesium.

7. The terminal-equipped covered electric wire according to claim 1, wherein the composition for a metal surface coating has a pH of four or higher.

8. The terminal-equipped covered electric wire according to claim 1, wherein a percentage of the base oil to a total of the adduct comprising the acidic phosphate ester and the metal and the base oil is within the range of 30 to 99 mass %.

9. The terminal-equipped covered electric wire according to claim 1, wherein the base oil has fluidity within the temperature range of 20 to 200° C.

10. The terminal-equipped covered electric wire according to claim 1, wherein a base material of the terminal metal fitting comprises one of copper and a copper alloy.

11. The terminal-equipped covered electric wire according to claim 10, wherein a surface of the base material of the terminal metal fitting is plated with one of tin, nickel, and gold.

* * * * *